United States Patent [19]
Benson, Jr.

[11] 3,724,620
[45] Apr. 3, 1973

[54] RELEASEABLE POWER TRANSMITTING DEVICE OF THE FRICTION PLATE TYPE

[75] Inventor: Carl I. Benson, Jr., Westwood, Mass.

[73] Assignee: Paragon Gears Incorporated, Taunton, Mass.

[22] Filed: Oct. 12, 1971

[21] Appl. No.: 188,201

[52] U.S. Cl............192/70.23, 192/89 A, 192/93 A
[51] Int. Cl..............................................F16d 13/56
[58] Field of Search....192/70.23, 70.24, 89 A, 93 A; 188/166, 167

[56] References Cited

UNITED STATES PATENTS

| | | | |
|---|---|---|---|
| 2,931,476 | 4/1960 | Zeidler et al | 192/93 A X |
| 1,323,727 | 12/1919 | Streich | 192/89 A |
| 2,009,964 | 7/1935 | Mottlau | 192/93 A X |
| 2,464,675 | 3/1949 | Dodge | 192/89 A |
| 3,127,969 | 4/1964 | Hansen | 192/93 A |

Primary Examiner—Allan D. Herrmann
Attorney—James E. Nilles

[57] ABSTRACT

A power-transmitting device including releaseable, interleaved friction plates between an input member and an output member, and which device is normally engaged and is releaseable by a camming action between certain of the parts. A spring pack assembly acts to maintain the interleaved friction plates in clamped-up position and the arrangement is such that the spring assembly compensates for wear of the plates and other parts and also provides a constant torque capacity for the device.

11 Claims, 8 Drawing Figures

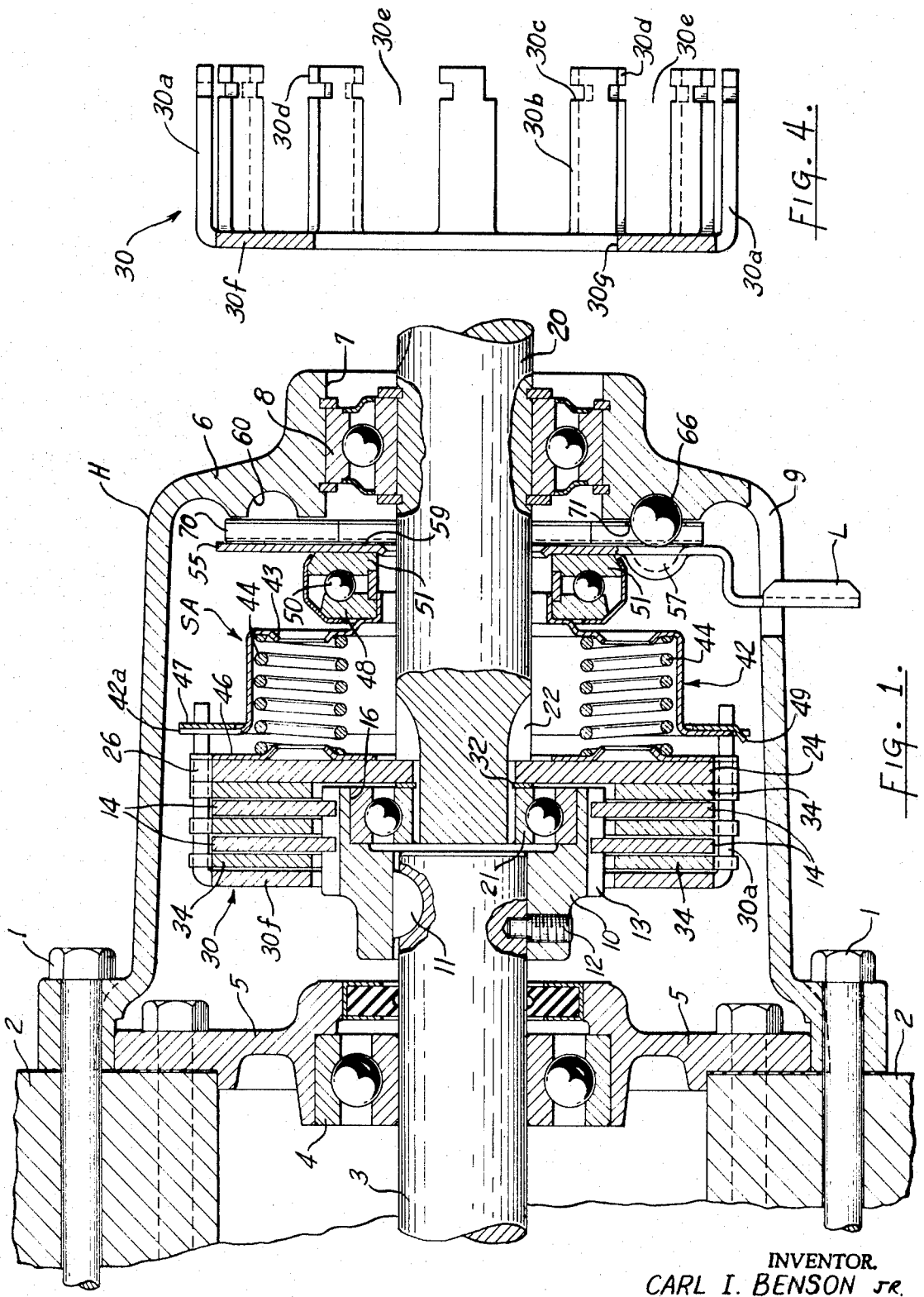

INVENTOR.
CARL I. BENSON, JR.
BY
James E. Nilles
ATTORNEY

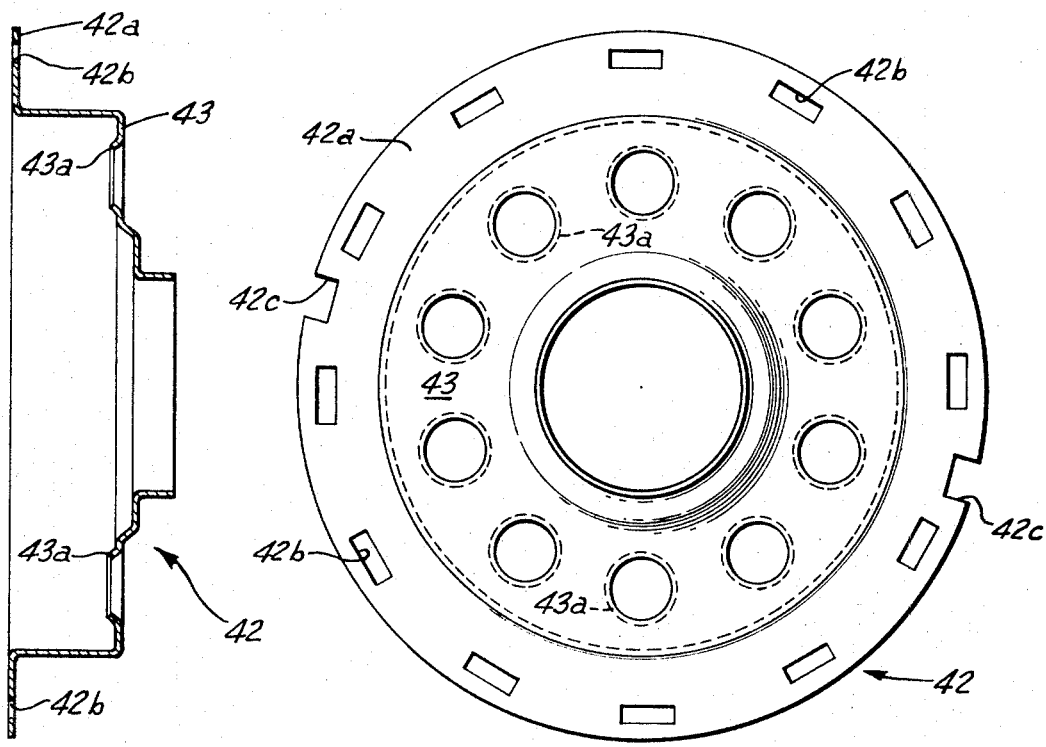
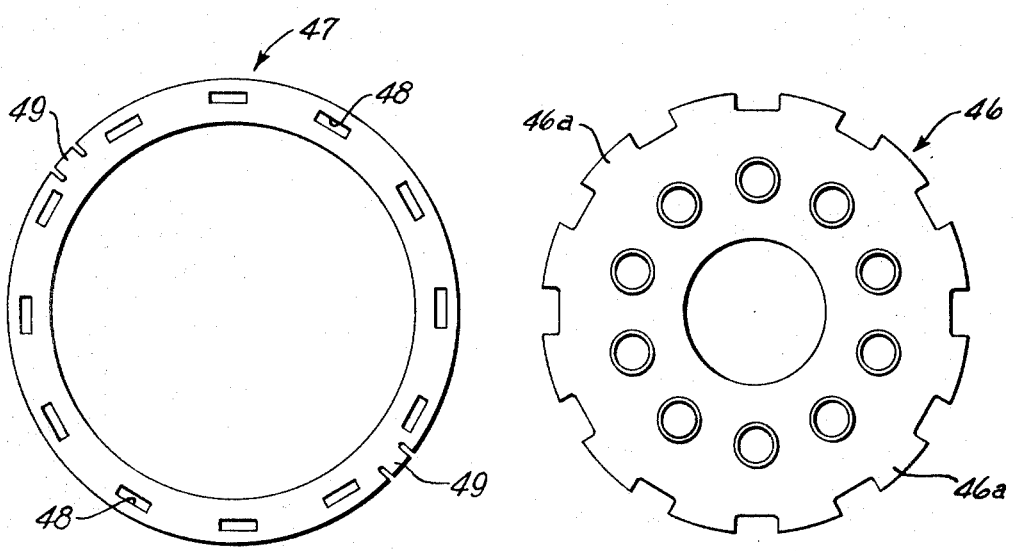

3,724,620

RELEASEABLE POWER TRANSMITTING DEVICE OF THE FRICTION PLATE TYPE

BACKGROUND OF THE INVENTION

The invention pertains to power-transmitting devices of the friction plate type in which plates can be disengaged by camming means which urge the clamp-up means for the plates to a releasing position.

The present invention is in the nature of an improvement over the patent to Hansen, U.S. Pat. No. 3,127,969, issued Apr. 7, 1964, which patent also provided a preloading on the clutch parts by means of Belleville springs.

SUMMARY OF THE INVENTION

The present invention provides a releasable power-transmitting device of the friction plate type having first and second rotatable parts mounted in coaxial alignment within a housing and wherein releaseable, interleaved friction plates are provided between the first and second rotatable members and camming means are provided between a portion of the housing and a spring pack assembly wherein the spring pack assembly can be urged to a compressed position in which it carries with it a carrier member that then moves away from the discs to provide their release. The camming means can be actuated in the other direction to cause the spring pack assembly to move in the opposite axial direction thereby causing its associated carrier to abut against the plates thereby causing plate clamp-up and engagement of the device.

The invention provides a device of the type which is particularly compact in an axial direction, is simple in construction and operation and has a minimum number of parts for the functions provided, is economical to manufacture and easy to maintain and which provides constant torque capacity regardless of wear of the parts such as the friction plates and which furthermore requires no adjustment of the parts in order to maintain the device in proper operating condition.

These and other objects and advantages of the present invention will appear hereinafter as this disclosure progresses, reference being had to the accompanying drawings.

BRIEF DESCRIPTION OF THE DRAWINGS

FIG. 1 is a longitudinal cross-sectional view through the device embodying the invention;

FIG. 4 is an elevational view in section of the friction plate carrier shown in FIG. 1;

FIG. 5 is a transverse elevational view taken from the right hand side as viewed in FIG. 1 of the spring collar, FIG. 6 is a longitudinal sectional view of the spring collar shown in FIG. 5, FIG. 7 is a transverse elevational view of the spring seat member reduced and taken from the right side as viewed in FIG. 1;

FIG. 8 is a transverse elevational view of the retainer ring shown in FIG. 1; on a reduced scale.

DESCRIPTION OF THE INVENTION

Figure 3:
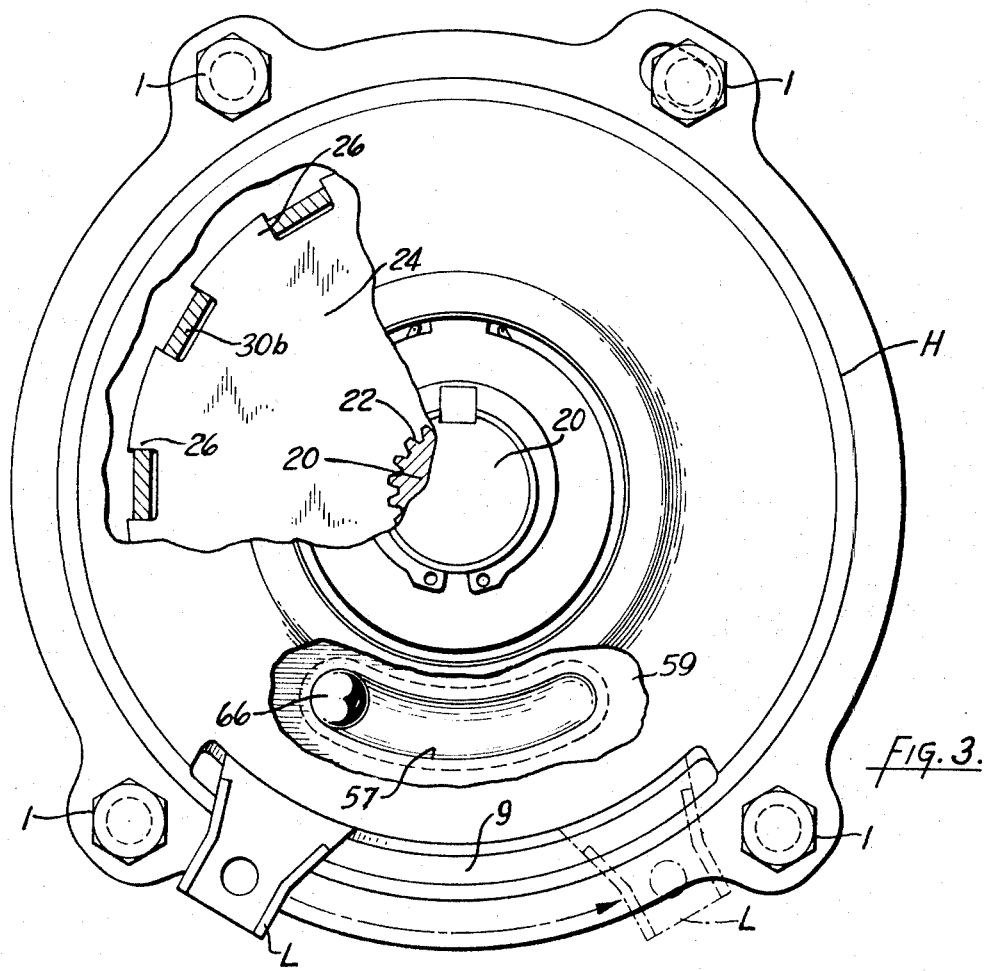
FIG. 3 is an end view of the device shown in FIG. 1 and taken generally along the line 3—3 in FIG. 1, certain parts broken away.

The invention has been shown as embodied in a power takeoff attachment in which the power is fed into the device at one end and taken out of the device at the other end. However, it should be noted that power may be transmitted through the device in either direction.

The device provided by the present invention includes a housing H having bolt means 1 for attachment to the rear end of a vehicle wall 2 or the like and from which a power shaft 3 extends. The power shaft 3 may be driven from a power source (not shown) and is suitably journalled in anti-friction bearings 4 in the stationary plate 5 that is also attached to the wall 2.

The housing H has an end, generally radially extending wall 6 that terminates in a central aperture 7 in which an anti-friction bearing assembly 8 is mounted. An opening 9 is provided adjacent the end of the housing and through which an operating lever L extends.

The power shaft 3 has an externally splined hub 10 keyed thereto by key 11 and held captive thereon by the set screw 12. The external splines 13 of the hub are adapted to accommodate the internal lugs of the friction plates 14 in the conventional manner whereby the plates can move slightly axially on the hub but rotate therewith. The hub includes a counterbore 16 in its end which end extends axially beyond the end of shaft 3.

A second rotatable member is provided in the device in the form of a power output member 20 having its inner end journalled in the anti-friction bearing assembly 21 which, in turn, is mounted in the counterbore 16 of the hub 10. The inner end of the shaft 20 is also splined as at 22 and has fixed thereon a plate-like drive connector 24. The periphery of the plate-like drive connector 24 has a series of peripherially spaced driving lugs 26 by means of which it is connected to a generally cup-shaped friction plate carrier 30, as will appear, and in this manner, the friction plate carrier 30 is driven with the shaft 20 by means of the intervening drive connector 24.

More specifically carrier 30 has an annular, axially extending wall 30a in which is formed a series of circumferentially spaced, axially extending fingers 30b which at their free ends have a recess 30c which in turn defines ear lugs 30d. Slots 30e are thus formed between and by the fingers 30b. The carrier also has a radially inwardly extending wall 30f terminating in a central opening 30g.

The lugs 26 of the connector 24 are engaged in the slots 30e of the carrier to form a driving connection therewith.

The drive connector 24 abuts axially against the snap ring 32 which is fixed on the end of shaft 20 and also serves to hold the bearing assembly 21 in position.

A series of clutch plates 34 are connected at their periphery with the slots 30e in the friction plate carrier 30, in the conventional manner and thus the plates 34 are free to move axially slightly in the carrier but are rotatable therewith. The plates 14 and 34 constitute interleaved friction plates which can be axially disengaged to thereby disconnect the power transmitting connection between the first rotatable member, that is shaft 3, and the second rotatable member, such as shaft 20, as will appear.

A spring pack assembly SA is located around shaft 20, abuts against the connector 24 and is also connected with the friction plate carrier 30, as will appear.

The spring assembly includes a generally cup-shaed spring collar 42, formed as a sheet metal stamping, and which has a radially outwardly extending flange 42a. A series of rectangular and circumferentially spaced openings 42b extend through flange 42a. A pair of open slots 42c are diametrically located in the periphery of the flange 42a of the collar 42. The collar also has a radially inwardly extending wall 43 having spring seats 43a.

A series of circumferentially spaced coil springs 44 act between the wall 43 and the spring seat member 46. Plate 46 has peripheral, circumferentially spaced lugs 46a for driving engagement in slots 36 of carrier 30.

A retainer ring 47 has a series of circumferentially spaced, rectangular openings 48 therethrough which fit over the fingers 30a of the retainer. Tabs 49 are formed in the periphery of ring 47 and when the ring is assembled against the flange 42a of collar 42 (as shown in FIG. 1), the ring is then turned slightly to lock behind the ear lugs 30d, and the tabs 49 of ring 47 are bent into slots 42c of the spring collar 42.

One race 48 of an anti-friction bearing assembly 50 is carried by the spring assembly SA, and the other race 51 of assembly 50 is carried by a cam plate 55 now to be described.

The cam plate 55 includes a series of circumferentially spaced ramps 57 which are formed as indentations or inclined grooves in the plate, and the plate also includes a series of flat portions 59 located between the ramps 57. The end wall 6 of the housing defines a generally circular track 60 which opens or faces towards the cam plate. A series of roller means 66 are located in the track 60 and are also adapted to either enter the ramps 57 of the cam plate when the plate is oscillated by its lever portion to one position, or, alternatively, the roller means are adapted to ride up on the flat portions 59 of the cam plate when the latter is oscillated to another position. As shown in FIG. 1, the roller means are located on the flat portions of the cam plate to urge the latter, and its associated spring assembly SA to the left as viewed in the drawings, wherein the generally radially and inwardly extending flange portion 30f of the friction plate carrier 30 is urged away from the clutch plates, thereby releasing the clutch plates and disconnecting the driving connection.

Figure 2:
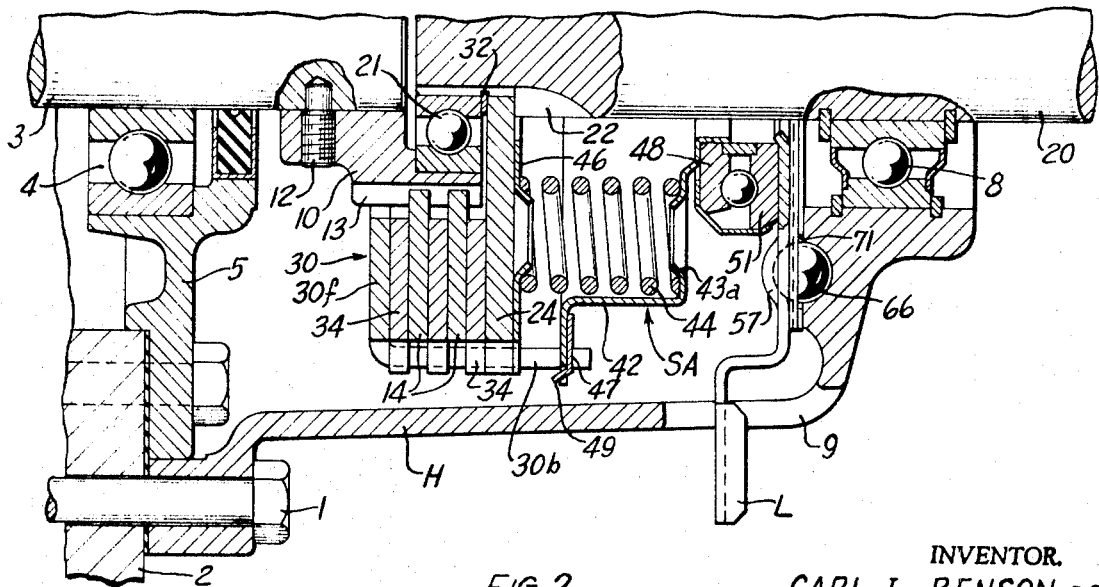
FIG. 2 is a view somewhat similar to FIG. 1 but showing the parts moved to a different position, only a portion of the FIG. 1 device.

As shown in FIG. 2, when the cam plate has been rotated to permit the roller means 66 to enter the ramps 57, the cam plate 55 moves to the right, as viewed in the drawings, thereby carrying with it the spring assembly SA and also shifting the plate carrier 30 to the right whereby the radial flange 30f of the carrier abuts against the friction plates 34. In this position, the springs 44 of the spring assembly resiliently urge the interleaved plates together in clamped-up or drive-transmitting position. When in the drive-transmitting position, the springs act to resiliently hold the plates together and thus provide a constant torque capacity for the device regardless of the amount of wear on the clutch plates or other parts. With this arrangement, no particular adjustment of the parts is required, and the device is held in the normally engaged position by the springs. The device is released by oscillating the lever, thereby permitting the roller means 66 to move up on the flat portions, as shown in FIG. 1, thereby causing the carrier 30 to shift to the left, more specifically causing flange 30f of the carrier to move away from its friction plate abutting position.

The roller means 66 may take various forms such as the balls shown, cylindrical roller bearings or other forms. In any event, the roller means may be held in proper circumferentially-spaced position by the wave-shaped disc 70 which has apertures 71 in which the roller means 66 are held captive.

The piloting of the second rotatable member 20 at its end and within the hub 10 of the first rotatable member, provides a particularly compact device in axial direction.

By making the roller means track 60 a part of the wall 6 of the housing, certain parts found necessary in prior art devices have been eliminated.

The device provided by the present invention is normally disengaged without the necessity of holding the lever L. The device can transmit constant torque regardless of the wear on the parts and is simple in construction and economical to manufacture and maintain.

I claim:

1. A releasable power-transmitting device comprising, a housing, a rotatable first member mounted in said housing, a rotatable second member mounted in said housing and arranged coaxially with said first member, a friction plate carrier, a drive connector between said carrier and said second member for rotation of said carrier and second member as a unit, interleaved friction plates connected to said first member and to said carrier and located axially between a portion of said carrier and said drive connector and establishing a disengageable power-transmitting connection therebetween, cam means shiftably mounted in said housing, said housing having a generally radially-extending wall defining a track which faces said cam means having cam ramps and also having flat portions, roller means in said track and adapted to abut against said cam means and ride in said ramps or on said flat portions, spring means located between and acting against said drive connector and said cam means, whereby when said cam means is moved to one position where said roller means rides on said flat portions, said spring means urges said carrier away from said plates to thereby release said power-transmitting connection, and when said cam means is moved to another position, said spring means shifts said portion of said carrier into engagement with said plates to cause clamp-up thereof and thereby engage said power-transmitting connection.

2. A device as set forth in claim 1 further characterized in that one of said members is rotatably journalled at one end in the other of said members.

3. A device as set forth in claim 1 further characterized in that said one member comprises a shaft having an externally splined hub fixed thereto and on which some of said friction plates are mounted, and said other member is journalled at its end in said hub.

4. A releasable power-transmitting device comprising, a housing, a rotatable first member mounted in said housing, a rotatable second member mounted in said housing and arranged coaxially with said first member, a friction plate carrier having a generally radially-extending portion, a drive connector between said carrier and said second member for rotation of said carrier and second member as a unit, interleaved friction plates connected to said first member and to said carrier and located axially between said radially extending portion of said carrier and said drive connector and establishing a disengageable power-transmitting connection therebetween, axially shiftable cam means mounted in said housing, said cam means having flat portions, said housing having a generally radially-extending wall defining a track which faces said cam means, roller means in said track and adapted to abut against said cam means and roll up on said flat portions, spring means located between and acting against said drive connector and said cam means, whereby when said cam means is located in one position where said rollers are on said flat portions, said spring means urges said radially-extending portion of said carrier away from said plates to thereby release said power-transmitting connection, and when said cam means is located in another position, said spring means is released and shifts said radially-extending portion of said carrier into engagement with said plates to cause clamp-up thereof and thereby engage said power-transmitting connection.

5. A device as set forth in claim 4 further characterized in that one of said members is rotatably journalled at one end in the other of said members.

6. A device as set forth in claim 4 further characterized in that said one member comprises a shaft having an externally splined hub fixed thereto and on which some of said friction plates are mounted, and said other member is journalled at its end in said hub.

7. A releaseable power-transmitting device comprising, a housing, a rotatable first member mounted in said housing, a rotatable second member mounted in said housing and arranged coaxially with said first member, a friction plate carrier having a generally radially-extending portion, a drive connector between said carrier and said second member for rotation of said carrier and second member as a unit, interleaved friction plates connected to said first member and to said carrier and located axially between said radially-extending portion and said drive connector and establishing a disengageable power-transmitting connection therebetween, an axially shiftable cam plate oscillatingly mounted in said housing and having a series of cam ramps thereon and also having generally flat portions between said ramps, said housing having a generally radially-extending wall defining a generally circular track which faces said cam plate, roller means in said track and adapted to roll on and between said flat portions and said ramps as said cam plate is oscillated, a spring pack assembly located between and acting against said drive connector and said cam plate, whereby when said roller means is located on said flat portion of said cam plate, said spring back assembly is compressed to urge said carrier radially-extending portion away from said plates to thereby release said power transmitting connection, and when said roller means is located in said cam plate ramps, said spring pack assembly is released and shifts said carrier radially radially-extending portion into engagement with said plates to cause clamp-up thereof and thereby engage said power-transmitting connection.

8. A device as set forth in claim 7 further characterized in that one of said members is rotatably journalled at one end in the other of said members.

9. A device as set forth in claim 7 further characterized in that said one member comprises a shaft having an externally splined hub fixed thereto and on which some of said friction plates are mounted, and said other member is journalled at its end in said hub.

10. A device as defined in claim 7 further characterized in that said pack assembly comprises, a generally cup-shaped collar having a radially outwardly extending flange engageable with said friction plate carrier, and a retainer ring abutting against said flange and carried by said carrier, said carrier and said ring having interengaging locking means therebetween, and a plurality of springs in said collar for urging said collar and carrier towards a clutch plate engaged position.

11. A releasable power-transmitting device comprising, a housing, a rotatable first member mounted in said housing, a rotatable second member mounted in said housing and arranged coaxially with said first member, a friction plate carrier having axially extending finger means, a drive connector between said carrier and said second member for rotation of said carrier and second member as a unit, interleaved friction plates connected to said first member and to said carrier and located axially between a portion of said carrier and said drive connector and establishing a disengageable power-transmitting connection therebetween, cam means shiftably mounted in said housing, a spring pack assembly located between and acting against said drive connector and said cam means, whereby when said cam means is moved to one position, said pack assembly urges said carrier away from said plates to thereby release said power-transmitting connection, and when said cam means is moved to another position, said pack assembly shifts said portion of said carrier into engagement with said plates to cause clamp-up thereof and thereby engage said power-transmitting connection; said spring pack assembly comprising, a generally cup-shaped collar having a radially outwardly extending flange engageable with said friction plate carrier fingers, and a retainer ring abutting against said flange and carried by said carrier fingers, said carrier fingers and said ring having interengaging locking means therebetween, and a plurality of springs in said collar for urging said collar and carrier towards a clutch plate engaged position.

* * * * *